United States Patent
Rattenberger et al.

(10) Patent No.: US 6,663,274 B1
(45) Date of Patent: Dec. 16, 2003

(54) DOMESTIC APPLIANCE HAVING SPRING-LOADED TOOLS

(75) Inventors: Bernhard Rattenberger, Viktring (AT); Hans Peter Krall, Eberstein (AT); Vincent Ten Horn, Sappemeer (NL); Harry Boer, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 12 days.

(21) Appl. No.: 09/688,645

(22) Filed: Oct. 16, 2000

(30) Foreign Application Priority Data

Oct. 22, 1999 (EP) .............................. 99890333

(51) Int. Cl.⁷ .................................. A47J 43/44
(52) U.S. Cl. ...................... 366/129; 366/286; 366/331; 366/344
(58) Field of Search ............................ 464/169; 416/69, 416/76, 77, 122, 135, 221, 206; 366/129, 197, 207, 286, 297–301, 331, 343, 344, 289

(56) References Cited

U.S. PATENT DOCUMENTS

| 356,694 | A | * | 1/1887 | Morey |
| 1,391,439 | A | * | 9/1921 | Willims |
| 2,699,925 | A | | 1/1955 | Madl |
| 2,747,845 | A | * | 5/1956 | Kohls et al. |
| 2,817,503 | A | | 12/1957 | Hahn |
| 2,842,346 | A | | 7/1958 | Koch |
| 2,898,094 | A | * | 8/1959 | O'Neill, Jr. |
| 4,270,367 | A | * | 6/1981 | Santore |

FOREIGN PATENT DOCUMENTS

CH  349389  11/1960

* cited by examiner

Primary Examiner—Tony G. Soohoo
Assistant Examiner—David Sorkin
(74) Attorney, Agent, or Firm—Ernestine C. Bartlett

(57) ABSTRACT

In a domestic appliance (1) having a housing (3) and having drive means (4) for rotationally driving at least one tool (5, 6) which is held by a holding means (17,18) and which is drivable with the aid of the drive means (4) so as to be rotated about a tool axis (31, 32), the tool (5, 6) is guided so as to be movable parallel to the direction of the tool axis (31, 32) and at least one spring means (39, 40) has been provided which resiliently loads a tool (5, 6) during rotational driving of this tool, namely towards the free end (33, 34) of the tool (5, 6).

8 Claims, 5 Drawing Sheets

DOMESTIC APPLIANCE HAVING SPRING-LOADED TOOLS

BACKGROUND OF THE INVENTION

The invention relates to a domestic appliance having at least one rotatably driven tool projecting from a housing, where the tool is movable axially during normal operation.

Such a domestic appliance is mentioned as prior art in the Swiss patent document CH 349 389 and is therefore known. The Swiss document discloses a domestic appliance constructed so that a tool is movable in an axial direction under the influence of gravity. Under the influence of gravity at least this one tool is held in contact with the container wall, for example the bottom of a container for holding foodstuffs to be processed, in a more or less satisfactory manner. Patent document CH 349 389 does not give any concrete details about the construction of the prior art described therein, so that the conclusion is obvious and permissible that also with this known construction the two tools are movable in axial directions under the influence of gravity. Though in many cases the movement of tools of a domestic appliance under the influence of gravity may lead to satisfactory results this is not always the case. For example, if the foodstuffs to be processed offer a comparatively high mechanical resistance to the tools, the tool load under the influence of gravity may be inadequate too keep all the tools applied to the bottom of the container holding the foodstuffs. Moreover, this condition may give rise to jerky axial movements, which feel unpleasant to a user who handles the domestic appliance. This prior art construction should therefore be regarded as not user-friendly.

SUMMARY OF THE INVENTION

It is an object of the invention to preclude the aforementioned problems and to provide an improved domestic appliance.

According to the invention, such an appliance has a spring urging the tool away from the housing, and a user controllable blocking device for blocking the tool from axial movement against the spring force.

The user controllable blocking device permits normal operation in a movement-permitted mode, in which sufficient force against the respective free end of one or more tools causes the tool or tools to be depressed into the housing, thereby deflecting the spring for each affected tool, or normal operation in a movement-blocked mode preventing depression of any of the tools in a direction parallel to the tool axis. The blocking device is movable between a blocking position and a release position. Each tool, when the blocking device is in its blocking position, is blocked against movement of the tool against the force of the spring means which loads the tool while still being normally operable. As a result, the user can select whether the tool axial position will conform to the shape of a container in which a foodstuff is being mixed or otherwise processed, or the free ends of the tools will invariably be held in a predetermined relative axial position determined by the lengths of the respective tools.

In a preferred embodiment, the blocking device includes a blocking sleeve for each tool, connected to a sleeve mount arranged to be moved transversely to the tool axis between a position in which the blocking sleeve is interposed between the spring for that tool and an inner sleeve in which the tool is held. This arrangement allows operation of a tool ejection device, by which the part of each tool inside the respective inner sleeve can be moved out of the inner sleeve to enable ejection of the tool.

According to a further preferred embodiment of the invention, the sleeve mount is pivotable about a pivotal axis which is oriented parallel to the tool axis. When the appliance has two tools parallel to each other, the pivotal axis is preferable midway between the axes of the two tools.

According to another preferred embodiment of the invention, the ejector device includes a respective ejector pin for each tool, arranged such that the sleeve mount is located axially between the ejector device and the inner and outer sleeves. The outer sleeves are driven rotationally and impart rotation to the inner tool-holding sleeves which are axially slidable in the respective outer sleeves. To eject the tools, the ejector pins pass through openings in the sleeve mount to engage the ends of the tools in the inner sleeves when the blocking device is in the release position, and pass through the respective blocking sleeves to engage the ends of the tools in the inner sleeves when the blocking device is in the blocking position. Thus ejection is independent of the blocking device position.

These and other aspects of the invention will become apparent from the embodiment described hereinafter by way of example and will be elucidated with reference to this example.

The invention will be described in more detail with reference to the drawings, which show an embodiment given by way of example, but to which the invention is not limited.

DESCRIPTION OF THE PREFERRED EMBODIMENTS

Figure 1:
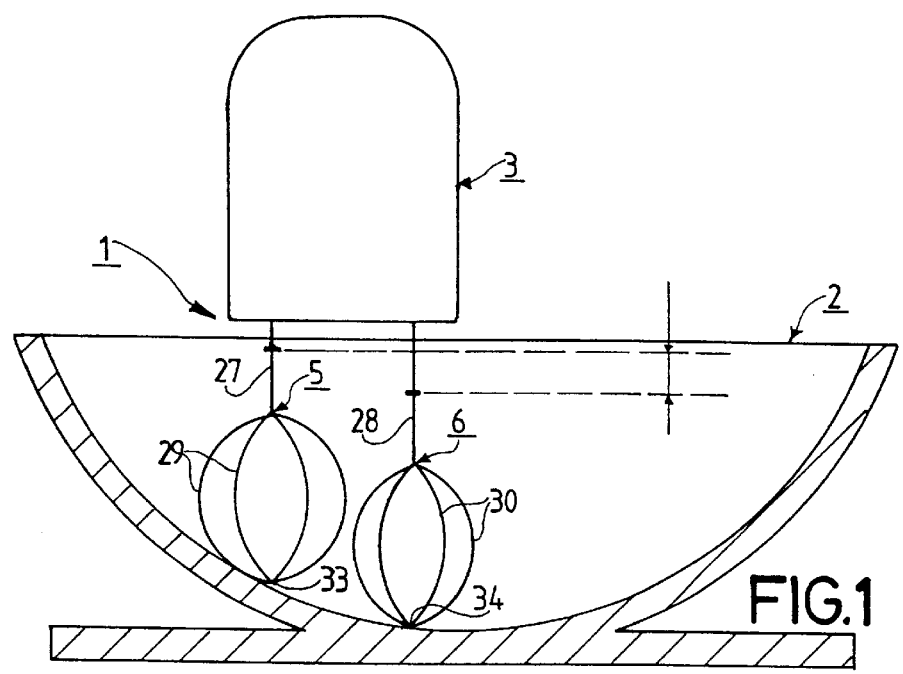
FIG. 1 shows in a highly diagrammatic manner a domestic appliance in accordance with an embodiment of the invention during a mode of operation in which the tools of the domestic appliance are touching the container wall of a mixing bowl.

FIG. 1 shows a domestic appliance 1 constructed for processing at least one foodstuff item present in a container 2. The container 2 is a mixing bowl. The domestic appliance 1 has a housing 3, shown only diagrammatically in FIG. 1 and only partly in FIG. 2.

The housing 3 accommodates a drive mechanism 4 for rotationally driving two tools 5 and 6 of the domestic appliance 1. In the present case the two tools 5 and 6 are formed by two beaters. In known manner, the drive comprises an electric motor, which is not shown in the drawing and which is secured by means of a mounting plate P and four mounting pins B. A worm, also not shown in the drawing, is rotationally drivable by the shaft of the electric motor. This worm is in mesh with a first worm wheel 7 and a second worm wheel 8. Each worm wheel 9 or 10 is connected to an outer sleeve 9 or 10, respectively. The two outer sleeves are interposed between an upper first mounting shield 11 and a lower second mounting shield 12, the two outer sleeves 9 and 10 each having end portions 13, 14 and 15, 16, respectively, which have a diameter smaller than the rest of the respective outer sleeve 9 or 10 and which are rotatably mounted in the two mounting shields 11 and 12. The two mounting shields 11 and 12 are fixedly connected to the mounting plate P. In this way, the two outer sleeves 9 and 10 are mounted so as to be rotationally drivable but basically immovable in axial directions.

In each of the outer sleeves 9 and 10 an inner sleeve 17 or 18, respectively, is arranged, the inner sleeves 17 and 18 being guided so as to be movable in axial directions with respect to the outer sleeves 9 and 10. The inner sleeves 17 and 18 each form a holding means for the respective tool 5 or 6. The first inner sleeve 17 as well as the second inner sleeve 18 each have eight coupling ribs 19 and 20, which engage corresponding coupling grooves 21 and 22, respectively, in the first outer sleeve 9 and in the second outer sleeve 10. Thus, the outer sleeves 9 and 10 and the inner sleeves 17 and 18 are locked in rotation relative to each other with the aid of the coupling ribs 19 and 20 and grooves 21 and 22. As a result the inner sleeves are rotationally drivable by the outer sleeves 9 and 10. A pin 23 or 24 projects laterally from each respective one of the two inner sleeves 17 and 18 in a radial direction and thus engages in an axial recess (not shown) in the respective outer sleeve 9 or 10. The laterally projecting pins 23 and 24 and the recesses which cooperate with these two pins 23 and 24 limit the axial range of movement of the inner sleeves 17 and 18 with respect to the outer sleeves 9 and 10.

As already stated, the inner sleeves 17 and 18 each form a holding means for holding a tool 5 or 6, respectively. Locking hooks 25 and 26 have been provided to retain a tool and enable the tools 5 and 6 to be retained in an interlocking fashion.

The two tools 5 and 6 will now briefly be described in more detail. The two tools 5 and 6 each have a tool shank 27 or 28, respectively, and mixing elements 29 and 30 which cross one another and are connected respectively to each tool shank 27 and 28. The tools 5 and 6 are rotatable about tool axes 31 and 32 which extend parallel to one another, and are driven by the mechanism 4. The two tools 5 and 6 project from the housing 3 of the domestic appliance 1, as shown in FIG. 1. The mixing elements 29 and 30, which cross one another, are interconnected in the area of the ends of the mixing elements 29 and 30 which are remote from the housing 3 and the two tool shanks 27 and 28, i.e. in the area of the free ends 33 and 34 of the two tools 5 and 6. Adjacent its free end 35 or 36 of the mixing elements 29 or 30, respectively, each tool shank 27 or 28 has a recess 37 or 38 adapted to cooperate with the respective locking hook 25 or 26.

The two tools 5 and 6 of the domestic appliance 1 are guided so as to be movable parallel to the directions of the tool axes 31 and 32, through the cooperation of the inner sleeves 17 and 18, which are guided so as to be movable in axial directions with respect to the outer sleeves 9 and 10, by the coupling ribs 19 and 20 and by the grooves 21 and 22. The excursions of the inner sleeves 17 and 18 and, consequently, of the tools 5 and 6 are limited with the aid of pins 23 and 24 which project laterally from the inner sleeves 17 and 18 and into recesses in the outer sleeves 23 and 24.

The domestic appliance 1 further has helical pressure springs 39 and 40 for respectively loading the tools 5 and 6 resiliently during the rotation of the tools 5 and 6, in such a manner that the free end portions 33 and 34 of the tools 5 and 6 are resiliently loaded parallel to the directions of the tool axes 31 and 32 and away from the housing 3 of the domestic appliance 1. Each tool 5 or 6 and its associated helical pressure spring 39 or 40 are coaxial with one another. In the present case, as is apparent particularly from FIGS. 5 and 6, a helical pressure spring 29 or 30 is mounted coaxially on each inner sleeve 17 or 18, for which purpose each inner sleeve 17 or 18 has a sleeve portion 41 or 42, respectively, having a part of a diameter which is small in comparison with the coupling ribs 19 and 20. Each of the helical pressure springs 39 and 40 acts upon a respective one of the inner sleeves 17 and 18 at one end and upon a respective one of the outer sleeves 9 and 10 at the other end.

As a result of the fact that in the domestic appliance 1 the inner sleeves 17 and 18 are guided so as to be axially movable with respect to the outer sleeves 9 and 10 and that the inner sleeves 17 and 18 are moved against the force of the helical pressure springs 39 and 40, it is achieved in a simple, very reliable and long lasting manner that in the area of their free ends the tools 5 and 6 can adapt their height positions to the shape of the container wall of a container 2. This construction guarantees that the tools 5 and 6 are held by the force of the springs 39 and 40 against the container wall of the container 2 in the area of their free ends 33 and 34 with a comparatively high reliability. As a result of this, it is achieved that both tools 5 and 6 always provide a substantial contribution to the processing of the foodstuffs in the container 2. Moreover, in the area of their free ends 33 and 34 the two tools 5 and 6 remain practically always applied to the container wall of the container 2 and are safeguarded against jerky movements in axial directions. This makes a user operating the domestic appliance 1 feel comfortable.

Figure 6:
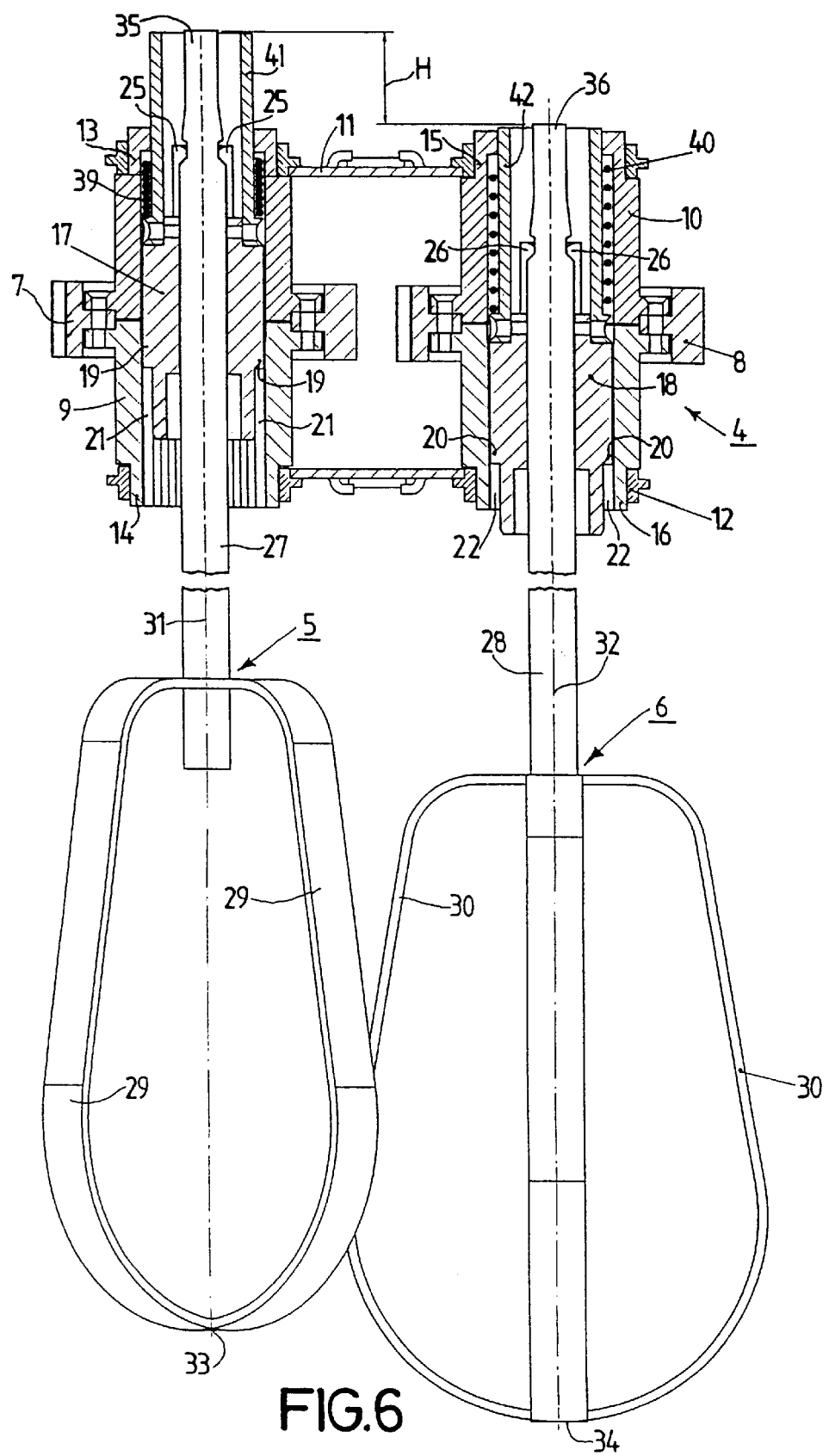
FIG. 6 shows, in the same way as FIG. 5, a detail of the mechanism for driving the tool of the appliance of FIG. 1.
Figure 7:
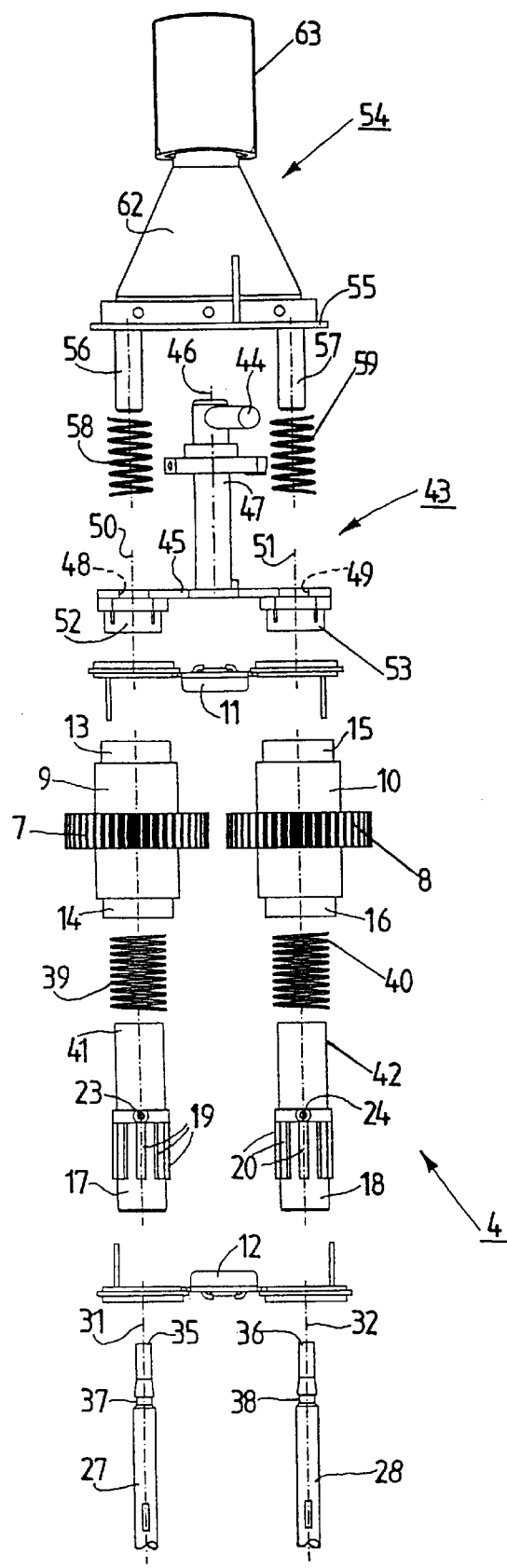
FIG. 7 is an exploded view which shows parts of the appliance of FIG. 1.

FIG. 6 shows a situation in which the second tool 6 is in an axially unchanged operating position in which the second tool 6 is held by the force of the second helical pressure spring 40, while the first tool 5 is shown in an axially changed operating position in which the first helical pressure spring 39 has been compressed. The difference in position between the two tools 5 and 6 is indicated by the reference symbol H in FIG. 6.

In order to enable the possibility of axially moving the inner sleeves 17 and 18 and, consequently, the tools 5 and 6 against spring force to be blocked by a user of the domestic appliance 1 the domestic appliance 1 in addition has blocking means 43. To actuate the blocking means 43 the blocking means 43 include a pin-shaped actuating element 44. When the blocking means 43 have been set into their blocking position the inner sleeves 17 and 18 and, consequently, the tools 6 and 7 are blocked against a movement of the tools 6 and 7 against the force of the helical pressure springs 39 and 40.

The blocking means 43 include a sleeve holder 45. The sleeve holder 45 is arranged to be movable transversely to the directions of the tool axes 31 and 32 so as to allow the blocking means 43 to be moved between their blocking position and their release position. In the embodiment shown, the sleeve holder 45 is arranged to be pivotable about a pivotal axis 46 which extends parallel to the directions of the tool axes 31 and 32. For this purpose, a shaft 47, which is coaxial with the pivotal axis 46, is connected to the sleeve holder 45, which shaft is pivotably mounting with the aid of appliance-mounted supporting means, which are not described any further herein. The pin-shaped actuating element 44 projects laterally from the shaft 47 in a radial direction.

The sleeve holder 45, which is substantially bar-shaped in plan view and which has rounded ends, has two holes 48 and 49, which are coaxial with respective axes 50 and 51. Two blocking sleeves 52 and 53 are connected to the sleeve holder 45, the first blocking sleeve 52 being coaxial with the first hole 48 and the second blocking sleeve 53 being coaxial with the second hole 49. The first blocking hole 52 has been provided for the first tool 5 and the second blocking tool 53 has been provided for the second tool 6.

Figure 5:
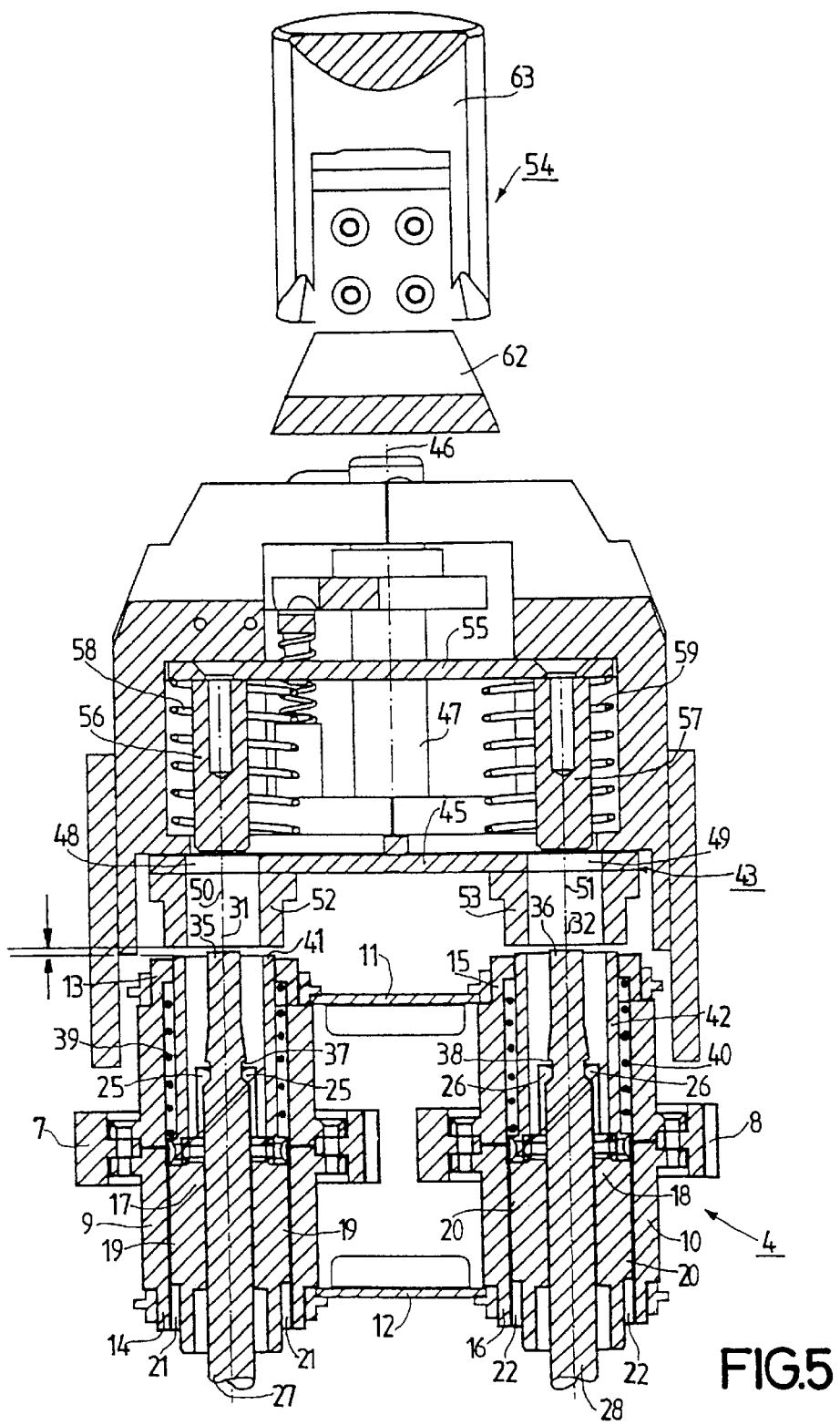
FIG. 5 is a sectional view taken on the line V—V in FIG. 4 which, to an enlarged scale as compared with FIGS. 2, 3 and 4, shows the part of the appliance of FIG. 1 shown in FIGS. 2, 3 and 4.

When the blocking means 43 have been set to their blocking position the blocking sleeves 52 and 53 are each coaxial with a respective inner sleeve 17 or 18, as is apparent particularly from FIG. 5. As soon as the blocking means 43 and, consequently, the two blocking sleeves 52 and 53 are in their blocking positions, the blocking sleeves 52 and 53 have only a very small axial clearance from the inner sleeves 17 and 18, as is also apparent from FIG. 5. As a result the inner sleeves 17 and 18 are blocked and the inner sleeves 17 and 18 cannot be moved against the force of the spring means 39 and 40. In this case the tools 5 and 6 are likewise blocked against axial movement in opposition to the force of the springs 39 and 40, and the free ends 33 and 34 of the two tools 5 and 6 are held unvaryingly at the same axial level.

Figure 2:
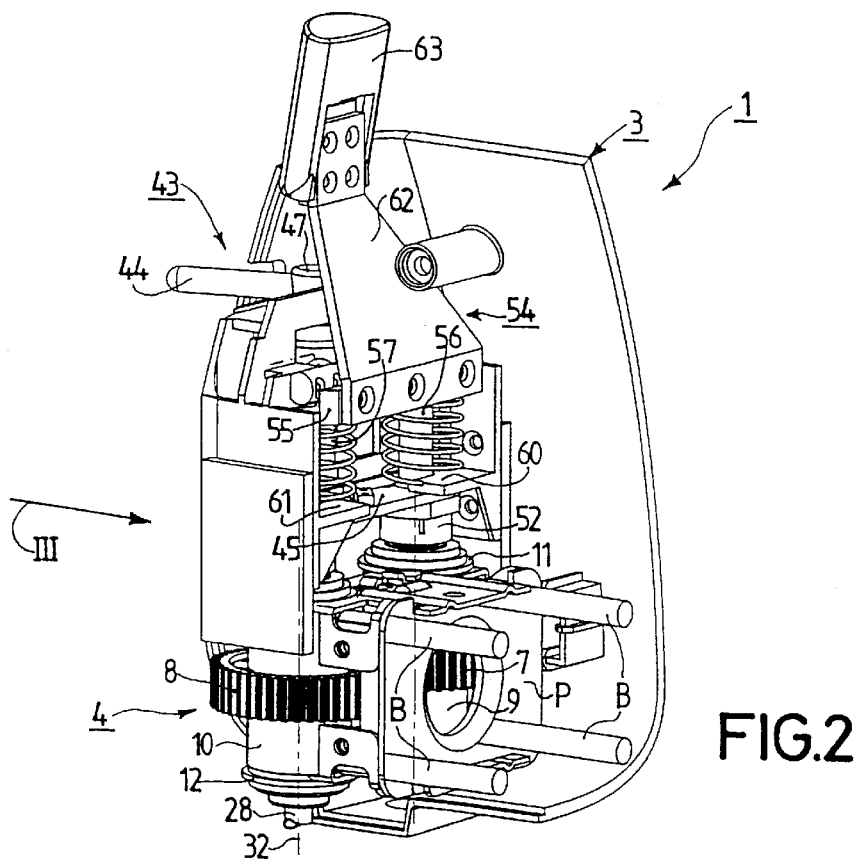
FIG. 2 shows internal details of the appliance of FIG. 1 in an oblique view from the top rear.
Figure 3:
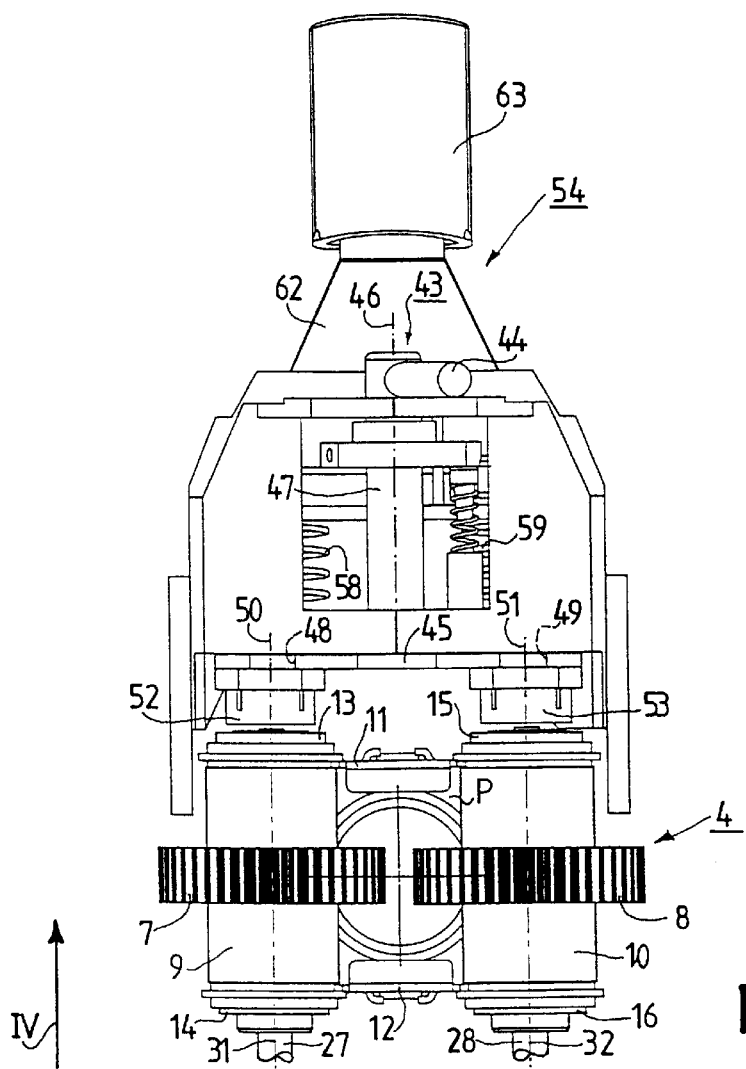
FIG. 3 is a front view as indicated by the arrow III in FIG. 2, showing the part of the appliance of FIG. 1 shown in FIG. 2.
Figure 4:
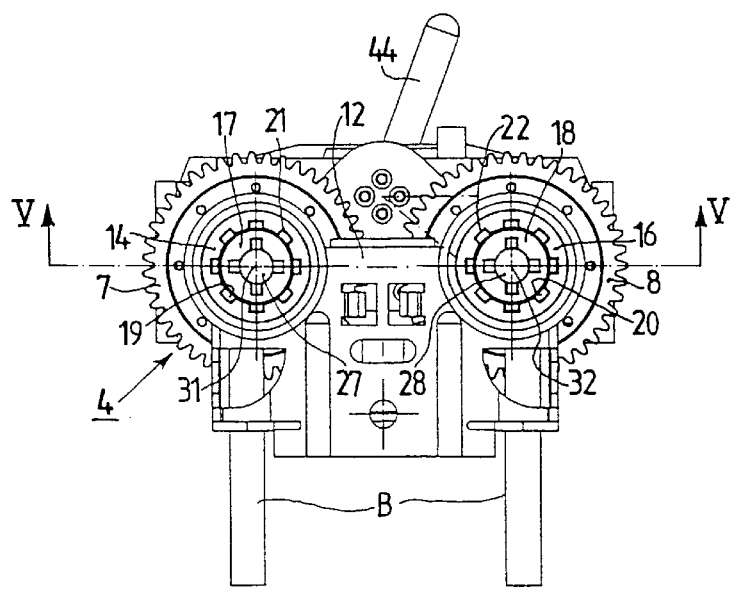
FIG. 4 is an underneath view as indicated by the arrow IV in FIG. 3, showing the part of the appliance of FIG. 1 shown in FIGS. 2 and 3.

Finally, it is to be noted that the domestic appliance 1 has an ejection mechanism 54, which is commonly known in such domestic appliances. The ejection mechanism 54 has an ejector mount 55 to which two ejector pins 56 and 57 are connected. The first ejector pin 56 is coaxial with the tool axis 31 of the first tool 5. The second ejector pin 57 is coaxial with the tool axis 32 of the second too 6. A return spring 58 or 59 in the form of a helical pressure spring is arranged on each of the two ejector pins 57 and 57. The two return springs 58 and 59 have one end which acts upon the ejector mount 55 and another end which acts upon a respective abutment plate 60 or 61, which is mounted stationarily in the domestic appliance 1, as can be seen in FIGS. 2 and 5. An actuating element 63 in the form of a push-button is connected to the ejector mount 55 via a connecting member 62.

The ejector mount 55 is movable against the force of the return springs 58 and 59 by the actuation of the actuating element 63. In this way, the ejector pins 56 and 57 are also movable in a direction towards the free ends 33 and 34 of the two tools 5 and 6, as a result of which the ejector pins 56 and 57 can be brought into operative engagement with the free ends 35 and 36 of the tools 5 and 6 and thereby release the interlocking engagement between the recesses 37 and 38 and the locking books 25 and 26. The tools 5 and 6 can then slip out of the inner sleeves 17 and 18 when the actuating element 63 is actuated and, as a consequence, the tools 5 and 6 are separated from the rest of the domestic appliance 1.

The invention is not limited to the example of an embodiment described hereinbefore. The characteristic features of the invention may, for example, also be provided in a domestic appliance having only one rotationally drivable tool or more than two rotationally drivable tools, for example three or four rotationally drivable tools. Moreover, guiding of the tools in an axial direction may be realized by means of a different construction. Furthermore, differently constructed spring means may be provided, for example wire springs or cup springs and the like.

What is claimed is:

1. A domestic appliance constructed to process at least one foodstuff item present in a container, having a housing, having drive means, accommodated in the housing, for rotationally driving at least one tool of the domestic appliance, having at least one tool which is held by a holding means of the domestic appliance and then projects from the housing, which tool is drivable so as to be rotated about a tool axis with the aid of the drive means, is guided so as to be movable parallel to the direction of the tool axis, and has a free end which is remote from the housing, and having at least one spring means, for resiliently loading the at least one tool during rotational driving, namely in such a manner that the free end of the tool is resiliently urged away from the housing parallel to the direction of the tool axis, wherein blocking means have been provided for permitting user selection of normal operation in a movement-permitted mode, or normal operation in a movement-blocked mode preventing movement of the tool in the direction parallel to the tool axis, the blocking means are movable between a blocking position and a release position, each tool, when the blocking means are in their blocking position, is blocked against movement of the tool against the force of the spring means which loads the tool while still being normally operable, and each tool, when the blocking means are in their release position, is free to move against the force of the spring means which loads the tool.

2. A domestic appliance as claimed in claim 1, wherein for each tool a rotationally drivable outer sleeve, which is mounted so as to be basically immovable in axial directions, has been provided, and an inner sleeve is arranged in each outer sleeve, and each inner sleeve forms a holding means for holding a tool, and each inner sleeve is rotationally drivable by the respective outer sleeve and is guided in the respective outer sleeve so as to be movable in axial directions, and a helical pressure spring is mounted coaxially on each inner sleeve, which spring acts upon the inner sleeve at one end and upon the outer sleeve at the other end, and said blocking means is arranged for blocking interposition between said at least one spring means and one of said sleeves.

3. A domestic appliance as claimed in claim 2, comprising two said two tools and respective inner springs and inner and outer sleeves, wherein the blocking means comprises a sleeve mount and a respective blocking sleeve arranged such that, when the blocking device is in the blocking position, the blocking sleeves are interposed between the respective springs and inner sleeves for blocking axial movement of said inner sleeves, the appliance further comprises a tool ejector device arranged to be operable by a user to eject said tools independent of the position of the blocking means, the ejector device includes a respective ejector pin for each tool, and is arranged such that the sleeve mount is located axially between the ejector device and inner sleeves, and to eject said tools the ejector pins pass through openings in the sleeve mount when the blocking device is in the release position, and pass through the respective blocking sleeves when the blocking device is in the blocking position.

4. A domestic appliance as claimed in claim 1, wherein the appliance further comprises a tool ejector device arranged to be operable by a uses to eject said tools independent of the position of the blocking means.

5. A domestic appliance as claimed in claim 1, wherein the blocking means include a blocking sleeve for each tool, and each blocking sleeve is connected to a sleeve mount, and the sleeve mount is arranged so as to be movable transversely to the direction of the tool axis, to allow the blocking means to be moved between their blocking position and their release position.

6. A domestic appliance as claimed in claim 5, wherein the sleeve mount is arranged so as to be pivotable about a pivotal axis which is oriented parallel to the direction of the tool axis.

7. A domestic appliance as claimed in claim 5, wherein each blocking sleeve is coaxial with an inner sleeve when the blocking means are in their blocking position.

8. A domestic appliance as claimed in claim 1, wherein at least two said tools have been provided, and the at least two said tools are guided so as to be movable parallel to the directions of the tool axis, and at least two said spring means have been provided, each spring means loading a respective tool resiliently.

* * * * *